US011809638B2

(12) United States Patent
Wang et al.

(10) Patent No.: US 11,809,638 B2
(45) Date of Patent: Nov. 7, 2023

(54) SCREEN DISPLAY CONTENT CONTROL METHOD AND APPARATUS, ELECTRONIC DEVICE, AND STORAGE MEDIUM

(71) Applicant: BOE TECHNOLOGY GROUP CO., LTD., Beijing (CN)

(72) Inventors: Xiaomin Wang, Beijing (CN); Wei Liang, Beijing (CN); Qimeng Sun, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 500 days.

(21) Appl. No.: 16/971,549

(22) PCT Filed: Jul. 19, 2019

(86) PCT No.: PCT/CN2019/096911
§ 371 (c)(1),
(2) Date: Aug. 20, 2020

(87) PCT Pub. No.: WO2021/012126
PCT Pub. Date: Jan. 28, 2021

(65) Prior Publication Data
US 2022/0291758 A1 Sep. 15, 2022

(51) Int. Cl.
G06F 3/0346 (2013.01)
G06F 1/16 (2006.01)
(52) U.S. Cl.
CPC .......... *G06F 3/0346* (2013.01); *G06F 1/1694* (2013.01); *G06F 2200/1614* (2013.01)
(58) Field of Classification Search
CPC ................ G06F 3/0346; G06F 1/1694; G06F 2200/1614
See application file for complete search history.

(56) References Cited

U.S. PATENT DOCUMENTS

2004/0130524 A1* 7/2004 Matsui .................. G06F 1/1694
345/156
2013/0002541 A1* 1/2013 Kanehira ............. H04N 23/633
345/156
(Continued)

FOREIGN PATENT DOCUMENTS

CN 101930282 A 12/2010
CN 103677320 A 3/2014
(Continued)

OTHER PUBLICATIONS

International Search Report and Written Opinion for International Application No. PCT/CN2019/096911 dated Apr. 20, 2020.
(Continued)

*Primary Examiner* — Afroza Chowdhury
(74) *Attorney, Agent, or Firm* — XSENSUS LLP

(57) ABSTRACT

The present disclosure relates to a method and an apparatus for controlling a screen display content of a display terminal, an electronic device, and a computer-readable storage medium, which belongs to the field of image display technology. The method includes: acquiring angular acceleration data collected by a motion sensor in a terminal device, and determining a movement trajectory of the terminal device according to the angular acceleration data; determining an operation instruction corresponding to the movement trajectory of the terminal device according to a preset mapping relationship between the movement trajectory and the operation instruction; and sending the operation instruction to control a screen of the display terminal to switch the display content.

19 Claims, 5 Drawing Sheets

(56) References Cited

U.S. PATENT DOCUMENTS

2019/0286293 A1* 9/2019 Shintani ................ G06F 1/1626
2019/0286306 A1* 9/2019 Shintani ................ G06F 3/0482

FOREIGN PATENT DOCUMENTS

| | | |
|---|---|---|
| CN | 105278667 A | 1/2016 |
| CN | 108255396 A | 7/2018 |
| CN | 109584908 A | 4/2019 |
| CN | 110018767 A | 7/2019 |
| KR | 20160061768 A | 6/2016 |
| WO | 2016095641 A1 | 6/2016 |

OTHER PUBLICATIONS

Office Action dated Jul. 11, 2023 in Chinese Patent Application No. 201980001090.7 with English translation thereof, 18 pages.

* cited by examiner

SCREEN DISPLAY CONTENT CONTROL METHOD AND APPARATUS, ELECTRONIC DEVICE, AND STORAGE MEDIUM

CROSS-REFERENCE TO RELATED APPLICATION

This application is a 35 U.S.C. § 371 national phase application of International Application No. PCT/CN2019/096911 filed Jul. 19, 2019, the contents of which being incorporated by reference in their entirety herein.

TECHNICAL FIELD

The present disclosure relates to the field of image display technology and, in particular, to a method and an apparatus for controlling a screen display content of a display terminal, an electronic device, and a computer-readable storage medium.

BACKGROUND

The display terminal is an electronic device that can display pictures, which can be used to display user photos and famous paintings, etc., and has a good display effect. In recent years, display terminals have been used more and more widely. In the related art, the user can control the display of the display terminal through a remote controller. For example, the user can control the display terminal to display a previous page content, a next page content, or details of current contents through the remote controller. However, when the display terminal is controlled by the remote controller, a user operation will fail if a distance between the remote controller and the display terminal is blocked by obstacles. The user needs to repeat the operation and the user experience is poor.

SUMMARY

The present disclosure aims to provide a method and an apparatus for controlling a screen display content of a display terminal, an electronic device, and a computer-readable storage medium.

Other characteristics and advantages of the present disclosure will become apparent through the following detailed description, or partly learned through the practice of the present disclosure.

According to a first aspect of the present disclosure, there is provided a method for controlling a screen display content of a display terminal, the method including:

acquiring angular acceleration data collected by a motion sensor in a terminal device, and determining a movement trajectory of the terminal device according to the angular acceleration data;

determining an operation instruction corresponding to the movement trajectory of the terminal device according to a preset mapping relationship between the movement trajectory and the operation instruction; and sending the operation instruction to control a screen of the display terminal to switch the display content.

In an exemplary embodiment of the present disclosure, before the acquiring angular acceleration data collected by a motion sensor in a terminal device, the method further includes:

determining a screen orientation of the terminal device according to acceleration data collected by the motion sensor;

performing the step of acquiring angular acceleration data collected by a motion sensor in a terminal device, when the screen orientation of the terminal device is a preset direction.

In an exemplary embodiment of the present disclosure, the determining a movement trajectory of the terminal device according to the angular acceleration data includes:

determining whether the terminal device rotates according to the angular acceleration data;

determining the movement trajectory of the terminal device according to the screen orientation and the angular acceleration data, in response to the rotation of the terminal device.

In an exemplary embodiment of the present disclosure, wherein the determining the movement trajectory of the terminal device according to the screen orientation and the angular acceleration data, in response to the rotation of the terminal device includes:

mapping an angular acceleration of each coordinate axis of a coordinate system where the terminal device is located in the angular acceleration data to the earth coordinate system, according to the screen orientation;

if an absolute value of the angular acceleration of the Z coordinate axis of the earth coordinate system is greater than an absolute value of the angular acceleration of the X coordinate axis of the earth coordinate system, determining the movement trajectory of the terminal device as a first movement trajectory when the angular acceleration of the Z coordinate axis of the earth coordinate system is greater than 0; and determining the movement trajectory of the terminal device as a second movement trajectory when the angular acceleration of the Z coordinate axis of the earth coordinate system is less than 0;

determining the movement trajectory of the terminal device as a third movement trajectory, if the absolute value of the angular acceleration of the X coordinate axis of the earth coordinate system is greater than or equal to the absolute value of the angular acceleration of the Z coordinate axis of the earth coordinate system.

In an exemplary embodiment of the present disclosure, wherein the sending the operation instruction to control a screen of the display terminal to switch the display content includes:

sending an operation instruction of displaying a previous page corresponding to the first movement trajectory, to control the screen of the display terminal to display a content of the previous page; or, sending an operation instruction of displaying a next page corresponding to the second movement trajectory, to control the screen of the display terminal to display a content of the next page; or, sending an operation instruction of displaying current details corresponding to the third movement trajectory, to control the screen of the display terminal to display details of current contents.

In an exemplary embodiment of the present disclosure, after the determining whether the terminal device rotates according to the angular acceleration data, the method further includes:

in response to the rotation of the terminal device, stopping sending the operation instruction within a preset time period; repeating the step of acquiring angular acceleration data collected by a motion sensor in a terminal device after the preset time period elapses.

In an exemplary embodiment of the present disclosure, after the determining whether the terminal device rotates according to the angular acceleration data, the method further includes:

returning to the step of acquiring angular acceleration data collected by a motion sensor in a terminal device in response to that the terminal device does not rotate.

In an exemplary embodiment of the present disclosure, the determining whether the terminal device rotates according to the angular acceleration data includes:

determining that the terminal device does not rotate if the angular acceleration of each coordinate axis of the coordinate system where the terminal device is located is less than a preset threshold;

otherwise, determining that the terminal device rotates.

In an exemplary embodiment of the present disclosure, the method further includes:

displaying a prompt message indicating that the terminal device is disabled, in response to detecting that the terminal device does not contain a motion sensor.

In an exemplary embodiment of the present disclosure, after the determining a screen orientation of the terminal device according to acceleration data collected by the motion sensor, the method further includes:

not preforming the step of sending the operation instruction to control a screen of the display terminal to switch the display content, when the screen orientation of the terminal device is not the preset direction.

In an exemplary embodiment of the present disclosure, a range of the preset time period is 0.5 s~2 s.

According to a second aspect of the present disclosure, there is provided a method for controlling a screen display content of a display terminal, the method including:

receiving a control message sent by a server, wherein the control message is sent after the server receives an operation instruction sent by a terminal device, the operation instruction is determined by the terminal device according to its own movement trajectory and a preset mapping relationship between the movement trajectory and the operation instruction;

switching the display content according to the control message.

According to a third aspect of the present disclosure, there is provided an apparatus for controlling a screen display content of a display terminal, the apparatus including:

a movement trajectory processor configured to acquire angular acceleration data collected by a motion sensor in a terminal device, and determine a movement trajectory of the terminal device according to the angular acceleration data;

an operation instruction processor configured to determine an operation instruction corresponding to the movement trajectory of the terminal device according to a preset mapping relationship between the movement trajectory and the operation instruction; and an operation instruction controller configured to send the operation instruction to control a screen of the display terminal to switch the display content.

In an exemplary embodiment of the present disclosure, the apparatus further includes:

a screen orientation processor configured to determine a screen orientation of the terminal device according to acceleration data collected by the motion sensor;

a movement trajectory processor configured to acquire angular acceleration data collected by a motion sensor in a terminal device, when the screen orientation of the terminal device is a preset direction.

In an exemplary embodiment of the present disclosure, the movement trajectory processor implements the determining a movement trajectory of the terminal device according to the angular acceleration data through following steps:

determining whether the terminal device rotates according to the angular acceleration data;

determining the movement trajectory of the terminal device according to the screen orientation and the angular acceleration data, in response to the rotation of the terminal device.

In an exemplary embodiment of the present disclosure, the movement trajectory processor implements the determining the movement trajectory of the terminal device according to the screen orientation and the angular acceleration data through following steps:

mapping an angular acceleration of each coordinate axis of a coordinate system where the terminal device is located in the angular acceleration data to the earth coordinate system, according to the screen orientation;

if an absolute value of the angular acceleration of the Z coordinate axis of the earth coordinate system is greater than an absolute value of the angular acceleration of the X coordinate axis of the earth coordinate system, determining the movement trajectory of the terminal device as a first movement trajectory when the angular acceleration of the Z coordinate axis of the earth coordinate system is greater than 0; and determining the movement trajectory of the terminal device as a second movement trajectory when the angular acceleration of the Z coordinate axis of the earth coordinate system is less than 0;

determining the movement trajectory of the terminal device as a third movement trajectory, if the absolute value of the angular acceleration of the X coordinate axis of the earth coordinate system is greater than or equal to the absolute value of the angular acceleration of the Z coordinate axis of the earth coordinate system.

In an exemplary embodiment of the present disclosure, the operation instruction controller is configured to:

send an operation instruction of displaying a previous page corresponding to the first movement trajectory, to control the screen of the display terminal to display a content of the previous page; or, send an operation instruction of displaying a next page corresponding to the second movement trajectory, to control the screen of the display terminal to display a content of the next page; or, send an operation instruction of displaying current details corresponding to the third movement trajectory, to control the screen of the display terminal to display details of current contents.

In an exemplary embodiment of the present disclosure, the apparatus further includes:

a repeating executing processor configured to, in response to the rotation of the terminal device, stop sending the operation instruction within a preset time period; repeat the step of acquiring angular acceleration data collected by a motion sensor in a terminal device after the preset time period elapses.

In an exemplary embodiment of the present disclosure, the apparatus further includes:

a returning processor configured to return to the movement trajectory processor in response to that the terminal device does not rotate.

In an exemplary embodiment of the present disclosure, the movement trajectory processor implements the determining whether the terminal device rotates according to the angular acceleration data through following steps:

determining that the terminal device does not rotate if the angular acceleration of each coordinate axis of the coordinate system where the terminal device is located is less than a preset threshold; otherwise, determining that the terminal device rotates.

In an exemplary embodiment of the present disclosure, the apparatus further includes:

a disabling prompt sending processor configured to display a prompt message indicating that the terminal device is disabled, in response to detecting that the terminal device does not contain a motion sensor.

In an exemplary embodiment of the present disclosure, the apparatus further includes:

a flow ending processor configured to not preform the step implemented by the operation instruction controller when the screen orientation of the terminal device is not the preset direction.

In an exemplary embodiment of the present disclosure, a range of the preset time period is 0.5 s~2 s.

According to a fourth aspect of the present disclosure, there is provided an apparatus for controlling a screen display content of a display terminal, the apparatus including:

a control message receiving processor configured to receive a control message sent by a server, wherein the control message is sent after the server receives an operation instruction sent by a terminal device, the operation instruction is determined by the terminal device according to its own movement trajectory and a preset mapping relationship between the movement trajectory and the operation instruction;

a screen display content switching controller configured to switch the display content according to the control message.

According to an aspect of the present disclosure, there is provided an electronic device, including: at least one hardware processor; and a memory for storing executable instructions of the at least one hardware processor; wherein, the at least one hardware processor is configured to execute any one of the methods described above by executing the executable instructions.

According to an aspect of the present disclosure, there is provided a computer-readable storage medium, having computer programs stored thereon, wherein the computer programs implement any one of the methods described above when executed by a processor.

BRIEF DESCRIPTION OF THE DRAWINGS

In order to more clearly explain embodiments of the present disclosure or technical solutions in the prior art, the drawings that need to be used in the description of the embodiments or the prior art will be briefly introduced in the following. Understandably, the drawings in the following description are just some embodiments of the present disclosure. For those of ordinary skill in the art, other drawings can be obtained based on these drawings without creative work.

DETAILED DESCRIPTION

The following will clearly and completely describe the technical solutions in the embodiments of the present disclosure with reference to the drawings in the embodiments of the present disclosure. Understandably, the described embodiments are only a part of the embodiments of the present disclosure, rather than all embodiments. Based on the embodiments in the present disclosure, all other embodiments obtained by those of ordinary skill in the art without creative work shall fall within the protection scope of the present disclosure.

Figure 1:
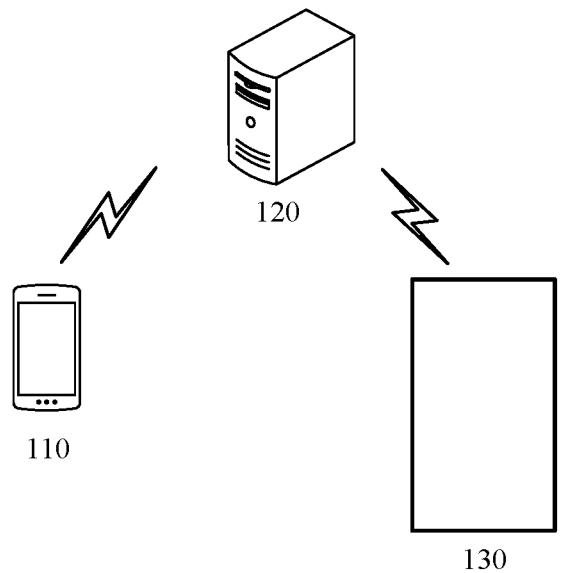
FIG. 1 shows an exemplary system architecture diagram which can apply the method and apparatus for controlling a screen display content of a display terminal according to an embodiment of the present disclosure.

FIG. 1 shows an exemplary system architecture diagram which can apply the method and apparatus for controlling a screen display content of a display terminal according to an embodiment of the present disclosure. As shown in FIG. 1, the system architecture may include: a terminal device 110, a server 120 and a display terminal 130 or the like. The terminal device 110 may be a smart phone, a tablet computer or the like. The server 120 is a server that can control the display terminal 130. The display terminal 130 is a terminal device that can display images. For example, the display terminal may be an electronic screen, a TV, a displayer, or the like.

The technical solutions of the embodiments of the present disclosure are described in detail below.

Figure 2:
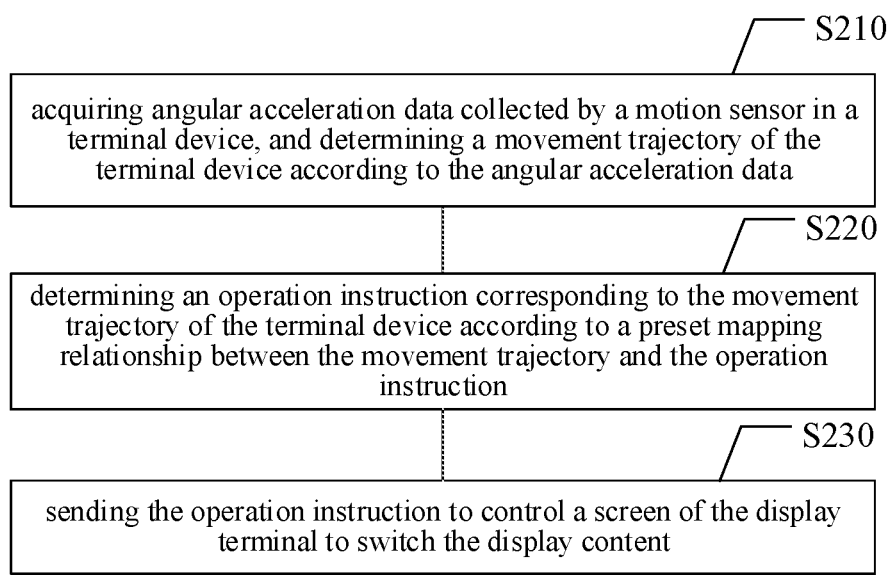
FIG. 2 schematically shows a flow chart of a method for controlling a screen display content of a display terminal in an exemplary embodiment of the present disclosure.

The method for controlling a screen display content of a display terminal according to the embodiment of the present disclosure may be applied to the terminal device 110 in FIG. 1. As shown in FIG. 2, the method for controlling a screen display content of a display terminal may include following steps:

S210: acquiring angular acceleration data collected by a motion sensor in a terminal device, and determining a movement trajectory of the terminal device according to the angular acceleration data;

S220: determining an operation instruction corresponding to the movement trajectory of the terminal device according to a preset mapping relationship between the movement trajectory and the operation instruction; and S230: sending the operation instruction to control a screen of the display terminal to switch the display content.

The beneficial effect of the above embodiment in FIG. 2 lies in that: the user can control the screen of the display terminal to switch the display content by adjusting the movement trajectory of the terminal device. On one hand, the user can control the display terminal with one action, which simplifies the operation process and improves the success rate of controlling the display terminal compared with the prior art where the remote controller needs to align with the display terminal. On the other hand, it is is a new operation manner to control the display terminal through the movement trajectory of the terminal device, which can bring different operation experience to the user.

Figure 3:
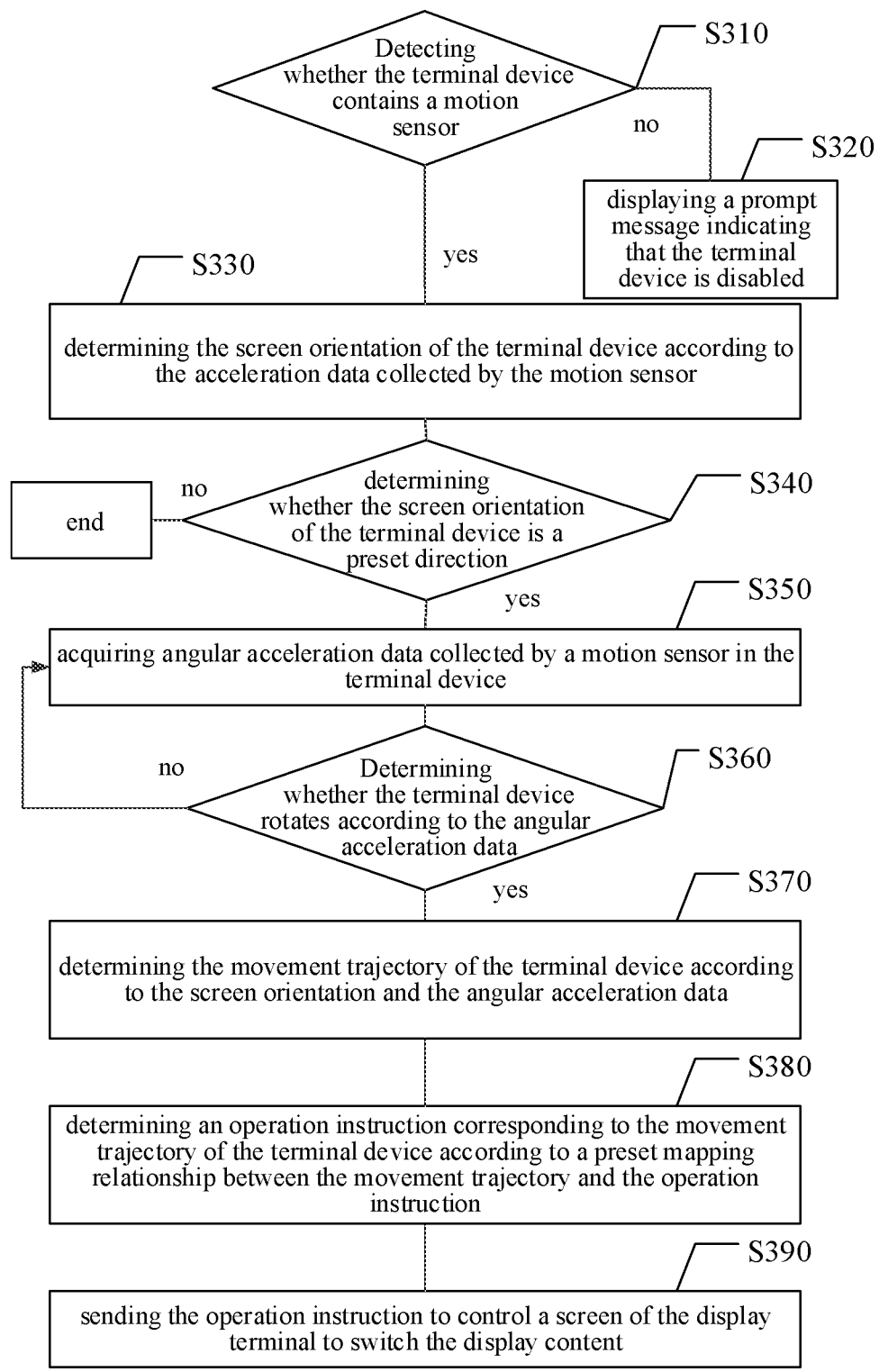
FIG. 3 schematically shows another flowchart of a method for controlling a screen display content of a display terminal in an exemplary embodiment of the present disclosure.

Referring to FIG. 3, FIG. 3 schematically shows another flowchart of a method for controlling a screen display content of a display terminal in an exemplary embodiment of the present disclosure and it includes following steps.

S310: it is detected whether the terminal device contains a motion sensor. If it is detected that the terminal device does not contain a motion sensor, S320 is performed; otherwise, S330 is performed.

In this exemplary embodiment, the motion sensor may be used to detect the orientation and motion of the terminal device, such as tilt, jitter, rotation or swing, or the like. The motion sensor may include: a geomagnetic sensor, an acceleration sensor, and a gyroscope sensor. The motion sensor can measure the orientation and rotational angular velocity of the terminal device. Therefore, it may determine whether the movement trajectory of the terminal device can be measured by detecting whether the terminal device contains a motion sensor.

S320: a prompt message indicating that the terminal device is disabled is displayed.

Specifically, if it is detected that the terminal device does not contain a motion sensor, the movement trajectory of the terminal device cannot be measured. Of course, the server cannot obtain the movement trajectory of the terminal device and control the display terminal screen to switch the display contents either. That is, the user cannot use the terminal device to control the display terminal, and a prompt message indicating that the terminal device is disabled can be displayed. For example, a prompt message of "device not supported" can be displayed.

S330: the screen orientation of the terminal device is determined according to the acceleration data collected by the motion sensor.

The acceleration sensor in the motion sensor is a sensor that can measure acceleration. The acceleration sensor is realized by the piezoelectric effect. The gravity sensing module is composed of a piece of "gravity block" and piezoelectric crystal. When the terminal device moves, the gravity block and the terminal device are subjected to the same acceleration, so that the force of the gravity block acting on the piezoelectric crystals in different directions will also change, so that the output voltage signal will also change, and the screen orientation of the terminal device can be judged based on the output voltage signal. The magnetic field sensor can measure the terrestrial magnetic field, which is composed of anisotropic magnetoresistive materials. When these materials feel a weak magnetic field change, their own resistance will change, and the output voltage will change, which can be used to judge the orientation of the terrestrial magnetic field. The combination of the magnetic field sensor and the acceleration sensor can more accurately determine the screen orientation of the terminal device.

S340: it is determined whether the screen orientation of the terminal device is a preset direction. If it is, S350 is performed, otherwise, the process ends.

In this exemplary embodiment, as for the control function of the display terminal realized by the terminal device, the function can also be enabled or disabled when the screen is in different orientations. For example, the function can be enabled when the screen orientation of the terminal device is the preset direction, and the function can be disabled when the screen orientation of the terminal device is not the preset direction. The preset direction is a preset screen orientation. For example, the preset direction may be the screen facing up or the screen facing left, or the like. Of course, the screen facing up or the screen facing left may be facing up or left within a certain range, not necessarily facing up or left directly.

After the screen orientation of the terminal device is obtained, it can be judged whether the screen orientation of the terminal device is the preset direction. If it is, the above function is enabled and S350 is executed; otherwise, the above function is disabled and the process ends, that is, S350 and subsequent steps are not executed. Of course, it is also possible to just not perform the step in S390, and this process is not shown in FIG. 3. In this way, misoperation can be prevented when the user does not want to enable the above function. When the user wants to use the above function, he/she only needs to adjust the screen orientation of the terminal device.

S350: angular acceleration data collected by a motion sensor in the terminal device is acquired.

The measurement physical quantity of the gyroscope sensor in the motion sensor is the rotational angular velocity of the terminal device when it is deflected and tilted. On the terminal device, the complete 3D movement cannot be measured or reconstructed by only using the acceleration sensor, but the gyroscope sensor can make good measurements of the rotation and deflection movement. The angular acceleration data includes the magnitude of the angular acceleration in different coordinate axes. Actual actions of the terminal device can be accurately analyzed and judged based on the angular acceleration data.

It should be noted that the coordinate axis herein refers to the coordinate axis of the coordinate system where the terminal device is located. Under normal circumstances, the coordinate axis of the coordinate system where the terminal device is located is defined as follows. The plane where the terminal device screen is located is the plane formed by the X coordinate axis and the Y coordinate axis. The shorter axis is the X axis, and the longer axis is the Y axis, the axis perpendicular to the plane where the terminal device screen is located is the Z axis.

S360: it is determined whether the terminal device rotates according to the angular acceleration data. In response to the rotation of the terminal device, S370 is performed; otherwise, the process returns to S350.

In this exemplary embodiment, after the angular acceleration data is obtained, it can be determined whether the terminal device rotates according to the angular acceleration data. It can be understood that if the angular acceleration of each coordinate axis is 0, it can be determined that the terminal device does not rotate. In an exemplary embodiment of the present disclosure, if the angular acceleration of each coordinate axis is relatively small, for example, the angular acceleration of each coordinate axis is less than a preset threshold, it can also be considered that the terminal device does not rotate. At this time, the process may return to S350, re-acquire the angular acceleration data and perform steps after S350. Otherwise, it is considered that the terminal device has rotated, and S370 is executed to determine the movement trajectory of the terminal device. The preset threshold may be a value set based on experience, and the magnitude of the value is not specifically limited herein.

S370: the movement trajectory of the terminal device is determined according to the screen orientation and the angular acceleration data.

Figure 4:
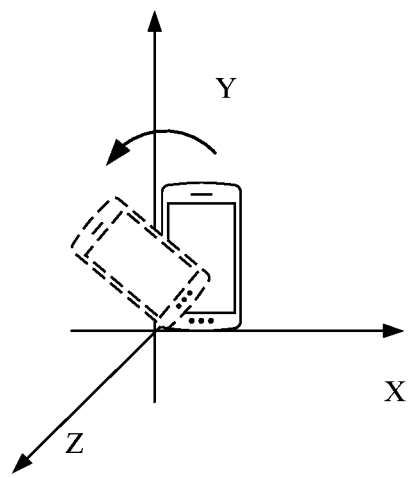
FIG. 4 schematically shows a schematic diagram of rotation of a terminal device in an exemplary embodiment of the present disclosure.
Figure 5:
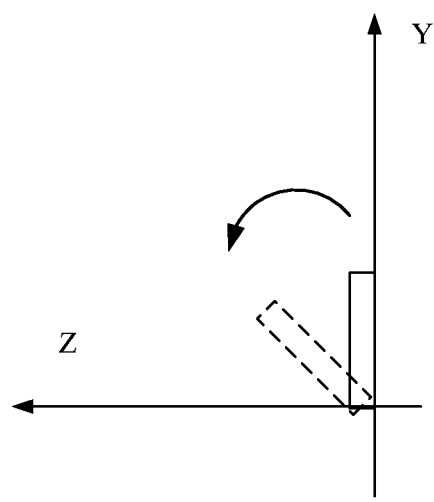
FIG. 5 schematically shows another schematic diagram of rotation of a terminal device in an exemplary embodiment of the present disclosure.

The angular acceleration data collected by the motion sensor is the angular acceleration of each coordinate axis of the coordinate system where the terminal device is located. When the screen of the terminal device corresponds to different orientations, the movement trajectory of the terminal device determined according to the angular acceleration of each coordinate axis is also different. Conversely, if the movement trajectory of the terminal device is the same, the coordinate axis acceleration used to determine the movement trajectory of the terminal device is also different. For example, as shown in FIG. 4, the screen orientation of the terminal device is placed forward vertically, if the generated angular acceleration data is the Z axis angular acceleration data, and the angular acceleration value is positive, then it can be determined that movement trajectory of the terminal device is turning left along the Z axis; if the generated angular acceleration data is the Z axis angular acceleration data, and the angular acceleration value is negative, then it can be determined that movement trajectory of the terminal device is turning right along the Z axis. As shown in FIG. 5, the screen orientation of the terminal device is placed leftward vertically, if the generated angular acceleration data is the X axis angular acceleration data, and the angular acceleration value is positive, then it can be determined that movement trajectory of the terminal device is turning left along the X axis; if the generated angular acceleration data is the X axis angular acceleration data, and the angular acceleration value is negative, then it can be determined that movement trajectory of the terminal device is turning right along the X axis.

The movement trajectory of the terminal device refers to the movement trajectory in the earth coordinate system. In an exemplary embodiment of the present disclosure, the angular acceleration of each coordinate axis of the coordinate system where the terminal device is located in the angular acceleration data may be mapped to the earth coordinate system according to the screen orientation, and the movement trajectory of the terminal device may be determined according to the angular acceleration value in the earth coordinate system. It can be understood that, if the terminal device is placed horizontally, the coordinate system where the terminal device is located is the earth coordinate system. If the terminal device is placed vertically, for example, as for the terminal device shown in FIG. 5, after the coordinate system conversion, the X axis angular acceleration of the coordinate system where the terminal device is located is converted into the Z axis angular acceleration of the earth coordinate system. The conversion between coordinate systems belongs to the prior art, and will not be repeated herein.

After mapping of the coordinate system is performed, if an absolute value of the angular acceleration of the Z coordinate axis of the earth coordinate system is greater than an absolute value of the angular acceleration of the X coordinate axis of the earth coordinate system, the movement trajectory of the terminal device is determined as a first movement trajectory when the angular acceleration of the Z coordinate axis of the earth coordinate system is greater than 0; and the movement trajectory of the terminal device is determined as a second movement trajectory when the angular acceleration of the Z coordinate axis of the earth coordinate system is less than 0. The first movement trajectory may be turning to the left, and the second movement trajectory may be turning to the right.

The movement trajectory of the terminal device is determined as a third movement trajectory, if the absolute value of the angular acceleration of the X coordinate axis of the earth coordinate system is greater than or equal to the absolute value of the angular acceleration of the Z coordinate axis of the earth coordinate system. The third movement trajectory may be rotating upward.

Referring to Table 1, Table 1 shows the screen orientation of the terminal device and the corresponding movement trajectory. It should be noted that the orientation of the terminal device may also include other orientations. For example, the terminal device stands sideways and the screen faces forward, or the terminal device stands sideways and the screen faces backward. As for each orientation in Table 1, it means that orientations within a certain range can be considered to belong to that orientation. That is, each orientation corresponds to a certain range. The range corresponding to each orientation can be set according to actual situations and is not limited herein.

TABLE 1

| screen orientation of the terminal device | movement trajectory of the terminal device |
| --- | --- |
| terminal device stands sideways, screen faces leftward | rotate leftward |
| terminal device stands sideways, screen faces leftward | rotate rightward |
| terminal device stands sideways, screen faces leftward | rotate upward |
| terminal device stands sideways, screen faces rightward | rotate leftward |
| terminal device stands sideways, screen faces rightward | rotate rightward |
| terminal device stands sideways, screen faces rightward | rotate upward |
| terminal device is horizontal, screen faces upward | rotate leftward |
| terminal device is horizontal, screen faces upward | rotate rightward |
| terminal device is horizontal, screen faces upward | rotate upward |
| terminal device is horizontal, screen faces downward | rotate leftward |
| terminal device is horizontal, screen faces downward | rotate rightward |
| terminal device is horizontal, screen faces downward | rotate upward |

In this exemplary embodiment, when the display terminal performs screen display, there may be a plurality of control display operations, and the type of movement trajectory of the terminal device may be selected according to the type of control display operation. In other words, if there are N types of control display operations when the display terminal screen is controlled to display, N types of movement trajectories can be selected when the movement trajectory of the terminal device is selected. Each movement trajectory corresponds to one type of control display operation. The movement trajectory of the terminal device can be selected according to usage habits of the user. For example, most users are used to turning the terminal device to the left, turning the terminal device to the right, and turning the terminal device upward, or the like.

S380: an operation instruction corresponding to the movement trajectory of the terminal device is determined according to a preset mapping relationship between the movement trajectory and the operation instruction.

As mentioned above, the type of the movement trajectory of the terminal device can be selected according to the type of the control display operation. That is, the mapping relationship between the movement trajectory and the operation instruction can be preset in the present disclosure. For example, the mapping relationship includes: when the movement trajectory is the first movement trajectory, it corresponds to the operation instruction of displaying the previous page; when the movement trajectory is the second movement trajectory, it corresponds to the operation instruction of displaying the next page; when the movement trajectory is the third movement trajectory, it corresponds to the operation instruction of displaying the current details, see Table 2. According to the mapping relationship, the operation instruction corresponding to the movement trajectory of the terminal device can be determined.

TABLE 2

| mapping relationship between movement trajectory and operation instruction | |
|---|---|
| rotate leftward | display the previous page |
| rotate rightward | display the next page |
| rotate upward | display current details |

S390, the operation instruction is sent to control a screen of the display terminal to switch the display content.

In this exemplary embodiment, after the operation instruction is determined, the operation instruction may be sent to the serve. The server may control the display terminal screen to switch the display content according to the operation instruction. Optionally, an operation instruction for displaying the previous page corresponding to the first movement trajectory may be sent to control the display terminal screen to display the content of the previous page. Alternatively, an operation instruction for displaying the next page corresponding to the second movement trajectory may be sent to control the display terminal screen to display the content of the next page. Alternatively, an operation instruction for displaying current details corresponding to the third movement trajectory may be sent to control the display terminal screen to display details of the current contents. In addition, in order to prevent misrecognition caused by the user's inertial recovery gesture, in response to the rotation of the terminal device, within a preset time period, sending of the operation instruction is stopped, and after the preset time period, S350 is repeated, that is, detection of movement trajectory of the terminal device at the next time is performed, this step is not shown in FIG. 3. Optionally, the value range of the preset time period is 0.5 s to 2 s, and the preset time period may be 1 s or 2 s, etc., which is not limited herein. If the preset time period is too short, for example, less than 0.5 s, the user's inertial recovery gesture has not been completed, the angular acceleration data change caused by the recovery gesture will be acquired and the switching operation instruction will be sent, which will be misrecognized as the user's next switching operation. If the preset time period from is too long, for example, greater than 2 s, when the user wants to perform the next switching operation after the inertia recovery gesture is completed, the terminal device cannot send corresponding operation instructions according to user operations, which lowers user experience. The test results show that when the preset time period is 1 s, the control effect of the display terminal through the terminal device is better, which more conforms to the time required for the user to inertially restore the gesture, and enhances the user experience.

The beneficial effect of the above embodiment in FIG. 3 lies in that: it can be determined whether or not to enable the following functions according to the screen orientation of the terminal device: the user can control the display terminal screen to switch the display contents by adjusting the movement trajectory of the terminal device. When the function is enabled, the display terminal screen is controlled to switch the display contents according to the movement trajectory of the terminal device. In addition, in order to prevent misoperation of the user, the movement trajectory of the terminal device may be detected after a preset period of time. In the embodiments of the present disclosure, the user can control the display terminal with one action, which simplifies the operation process and improves the success rate of controlling the display terminal compared with the prior art where the remote controller needs to align with the display terminal. On the other hand, it is is a new operation manner to control the display terminal through the movement trajectory of the terminal device, which can bring different operation experience to the user.

Figure 6:
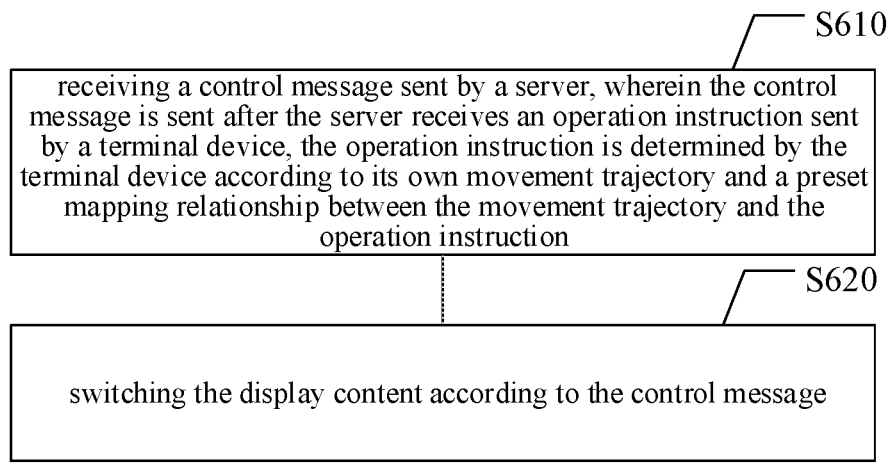
FIG. 6 schematically shows another flowchart of a method for controlling a screen display content of a display terminal in an exemplary embodiment of the present disclosure.

Referring to FIG. 6, FIG. 6 schematically shows another flowchart of a method for controlling a screen display content of a display terminal in an exemplary embodiment of the present disclosure, which is applied to a display terminal and includes following steps:

S610, receiving a control message sent by a server, wherein the control message is sent after the server receives an operation instruction sent by a terminal device, the operation instruction is determined by the terminal device according to its own movement trajectory and a preset mapping relationship between the movement trajectory and the operation instruction; and S620: switching the display content according to the control message.

The embodiment in FIG. 6 is an embodiment of the display terminal side corresponding to the embodiment in FIG. 3, and the relevant parts have been described in the embodiment in FIG. 3, which will not be repeated herein.

The beneficial effect of the above embodiment in FIG. 6 is that the display terminal screen can be controlled to switch display contents according to the movement trajectory of the terminal device. On one hand, the user can control the display terminal with one action, which simplifies the operation process and improves the success rate of controlling the display terminal compared with the prior art where the remote controller needs to align with the display terminal. On the other hand, it is is a new operation manner to control the display terminal through the movement trajectory of the terminal device, which can bring different operation experience to the user.

Figure 7:
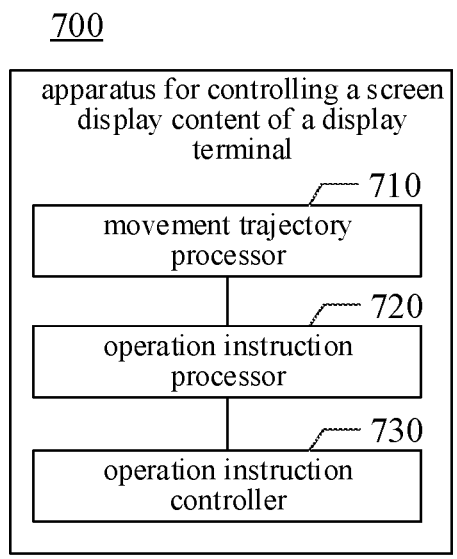
FIG. 7 schematically shows a structural diagram of an apparatus for controlling a screen display content of a display terminal in an exemplary embodiment of the present disclosure.

Corresponding to the foregoing method embodiment, the embodiment of the present disclosure also discloses an apparatus for controlling a screen display content of a display terminal. Referring to FIG. 7, FIG. 7 schematically shows a structural diagram 700 of an apparatus for controlling a screen display content of a display terminal in an exemplary embodiment of the present disclosure, which includes:

a movement trajectory processor 710 configured to acquire angular acceleration data collected by a motion sensor in a terminal device, and determine a movement trajectory of the terminal device according to the angular acceleration data;

an operation instruction processor 720 configured to determine an operation instruction corresponding to the movement trajectory of the terminal device according to a preset mapping relationship between the movement trajectory and the operation instruction; and an operation instruction controller 730 configured to send the operation instruction to control a screen of the display terminal to switch the display content.

In an exemplary embodiment of the present disclosure, the apparatus further includes:

a screen orientation processor configured to determine a screen orientation of the terminal device according to acceleration data collected by the motion sensor; and a movement trajectory processor configured to acquire angular acceleration data collected by a motion sensor in a terminal device, when the screen orientation of the terminal device is a preset direction.

In an exemplary embodiment of the present disclosure, the movement trajectory processor implements the determining a movement trajectory of the terminal device according to the angular acceleration data through following steps:

determining whether the terminal device rotates according to the angular acceleration data;

determining the movement trajectory of the terminal device according to the screen orientation and the angular acceleration data, in response to the rotation of the terminal device.

In an exemplary embodiment of the present disclosure, the movement trajectory processor implements the determining the movement trajectory of the terminal device according to the screen orientation and the angular acceleration data through following steps:

mapping an angular acceleration of each coordinate axis of a coordinate system where the terminal device is located in the angular acceleration data to the earth coordinate system, according to the screen orientation;

if an absolute value of the angular acceleration of the Z coordinate axis of the earth coordinate system is greater than an absolute value of the angular acceleration of the X coordinate axis of the earth coordinate system, determining the movement trajectory of the terminal device as a first movement trajectory when the angular acceleration of the Z coordinate axis of the earth coordinate system is greater than 0; and determining the movement trajectory of the terminal device as a second movement trajectory when the angular acceleration of the Z coordinate axis of the earth coordinate system is less than 0;

determining the movement trajectory of the terminal device as a third movement trajectory, if the absolute value of the angular acceleration of the X coordinate axis of the earth coordinate system is greater than or equal to the absolute value of the angular acceleration of the Z coordinate axis of the earth coordinate system.

In an exemplary embodiment of the present disclosure, the operation instruction controller is configured to:

send an operation instruction of displaying a previous page corresponding to the first movement trajectory, to control the screen of the display terminal to display a content of the previous page; or, send an operation instruction of displaying a next page corresponding to the second movement trajectory, to control the screen of the display terminal to display a content of the next page; or, send an operation instruction of displaying current details corresponding to the third movement trajectory, to control the screen of the display terminal to display details of current contents.

In an exemplary embodiment of the present disclosure, the apparatus further includes:

a repeating executing processor configured to, in response to the rotation of the terminal device, stop sending the operation instruction within a preset time period; repeat the step of acquiring angular acceleration data collected by a motion sensor in a terminal device after the preset time period elapses.

In an exemplary embodiment of the present disclosure, the apparatus further includes:

a returning processor configured to return to the movement trajectory processor in response to that the terminal device does not rotate.

In an exemplary embodiment of the present disclosure, the movement trajectory processor implements the determining whether the terminal device rotates according to the angular acceleration data through following steps:

determining that the terminal device does not rotate if the angular acceleration of each coordinate axis of the coordinate system where the terminal device is located is less than a preset threshold; otherwise, determining that the terminal device rotates.

In an exemplary embodiment of the present disclosure, the apparatus further includes:

a disabling prompt sending processor configured to display a prompt message indicating that the terminal device is disabled, in response to detecting that the terminal device does not contain a motion sensor.

In an exemplary embodiment of the present disclosure, the apparatus further includes:

a flow ending processor configured to not preform the step implemented by the operation instruction controller when the screen orientation of the terminal device is not the preset direction.

In an exemplary embodiment of the present disclosure, a range of the preset time period is 0.5 s~2 s.

Figure 8:
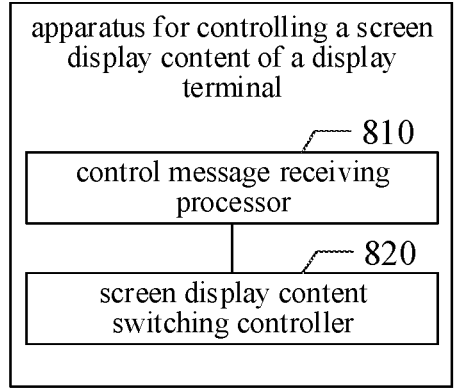
FIG. 8 schematically shows another structural diagram of an apparatus for controlling a screen display content of a display terminal in an exemplary embodiment of the present disclosure.

Referring to FIG. 8, FIG. 8 schematically shows another structural diagram 800 of an apparatus for controlling a screen display content of a display terminal in an exemplary embodiment of the present disclosure, which includes:

a control message receiving processor 810 configured to receive a control message sent by a server, wherein the control message is sent after the server receives an operation instruction sent by a terminal device, the operation instruction is determined by the terminal device according to its own movement trajectory and a preset mapping relationship between the movement trajectory and the operation instruction; and a screen display content switching controller 820 configured to switch the display content according to the control message.

The specific details of each processor/controller in the above-mentioned apparatus have been described in detail in the embodiment of the method part, and therefore will not be repeated.

Each processor in the above apparatus can be a general-purpose processor, including a central processing unit, a network processor, etc.; it can also be a digital signal processor, an application specific integrated circuit, a field programmable gate array, or other programmable logic devices, discrete gates or transistor logic devices, discrete hardware components. Each controller in the above-mentioned apparatus may be a programmable logic controller or a combinational logic controller or the like.

In an exemplary embodiment of the present disclosure, there is also provided an electronic device, including: a processor; a memory for storing executable instructions of the processor; wherein the processor is configured to execute all or part of the steps of the method for controlling a screen display content of a display terminal in exemplary embodiments of the present disclosure.

Figure 9:
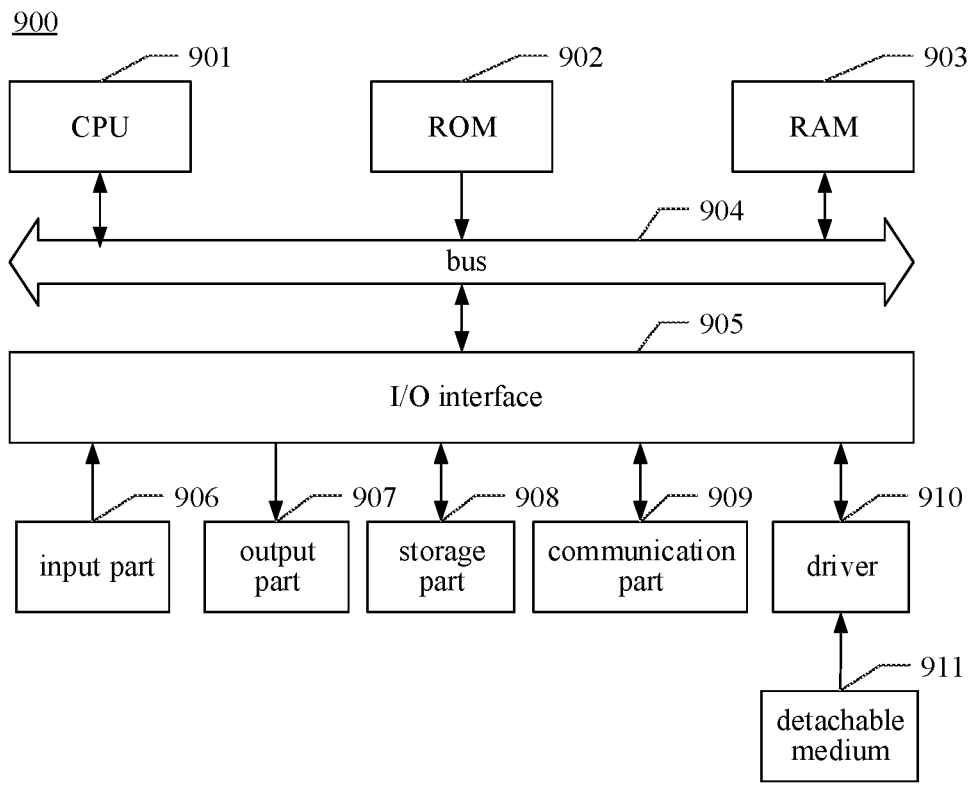
FIG. 9 schematically shows an electronic device for implementing the above method in an exemplary embodiment of the present disclosure.

FIG. 9 shows a schematic structural diagram of a computer system for implementing an electronic device of an embodiment of the present disclosure. It should be noted that the computer system 900 of the electronic device shown in FIG. 9 is only an example, and should not bring any limitation to the functions and usage scope of the embodiments of the present disclosure.

As shown in FIG. 9, the computer system 900 includes a central processing unit (CPU) 901, which can perform various appropriate actions and processing based on programs stored in a read-only memory (ROM) 902 or programs loaded from a storage part 908 into a random access memory (RAM) 903. In the RAM 903, various programs and data required for system operation are also stored. The CPU 901, the ROM 902, and the RAM 903 are connected to each other through a bus 904. An input/output (I/O) interface 905 is also connected to the bus 904.

The following components are connected to the I/O interface 905: an input part 906 including a keyboard, a mouse, etc.; an output part 907 including a cathode ray tube (CRT), a liquid crystal display (LCD), etc. and speakers, etc.; a storage part 908 including a hard disk, etc.; and the communication part 909 including a network interface card such as a local area network (LAN) card, a modem, etc. The communication section 909 performs communication processing via a network such as the Internet. The driver 910 is also connected to the I/O interface 905 as needed. A detachable medium 911, such as a magnetic disk, an optical disk, a magneto-optical disk, a semiconductor memory, etc., is installed on the driver 910 as needed, so that the computer program read therefrom is installed into the storage part 908 as needed.

In particular, according to an embodiment of the present disclosure, the process described above with reference to the flowchart can be implemented as a computer software program. For example, the embodiments of the present disclosure include a computer program product, which includes a computer program carried on a computer-readable medium, and the computer program contains program codes for executing the method shown in the flowchart. In such an embodiment, the computer program may be downloaded and installed from the network through the communication part 909, and/or installed from the detachable medium 911. When the computer program is executed by the central processing unit (CPU) 901, various functions defined in the apparatus of the present application are executed.

In an exemplary embodiment of the present disclosure, there is also provided a computer-readable storage medium on which a computer program is stored, and the computer program implements any one of the methods described above when executed by a processor.

It should be noted that the computer-readable storage medium shown in the present disclosure may be, but not limited to, an electrical, magnetic, optical, electromagnetic, infrared, or semiconductor system, apparatus, or device, or any combination of the above and, as such, may include a non-transitory computer-readable storage medium. More specific examples of computer-readable storage media may include, but not limited to: electrical connections with one or more wires, portable computer disks, hard disks, random access memory (RAM), read-only memory (ROM), erasable Programmable read only memory (EPROM or flash memory), optical fiber, portable compact disk read only memory (CD-ROM), optical storage device, magnetic storage device, or any suitable combination of the above. In the present disclosure, a computer-readable storage medium may be any tangible medium that contains or stores a program, and the program may be used by or in combination with an instruction execution system, apparatus, or device. In the present disclosure, a computer-readable signal medium may include a data signal propagated in a baseband or as a part of a carrier wave, and a computer-readable program code is carried therein. This propagated data signal can take many forms, including but not limited to electromagnetic signals, optical signals, or any suitable combination of the above. The computer-readable signal medium may also be any computer-readable medium other than the computer-readable storage medium. The computer-readable medium may send, propagate, or transmit the program for use by or in combination with the instruction execution system, apparatus, or device. The program code contained on the computer-readable medium can be transmitted by any suitable medium, including, but not limited to, wireless, wire, optical cable, radio frequency, etc., or any suitable combination thereof.

Those skilled in the art will easily think of other embodiments of the present disclosure after considering the specification and practicing the disclosure disclosed herein. This application is intended to cover any variations, uses, or adaptive changes of the present disclosure. These variations, uses, or adaptive changes follow the general principles of the present disclosure and include common knowledge or conventional technical means in the technical field not disclosed in the present disclosure. The description and the embodiments are only regarded as exemplary, and the true scope and spirit of the present disclosure are pointed out by the claims.

It should be understood that the present disclosure is not limited to the precise structure that has been described above and shown in the drawings, and various modifications and changes can be made without departing from its scope. The scope of the present disclosure is limited only by the appended claims.

What is claimed is:

1. A method for controlling a screen display content of a display terminal, comprising:
   acquiring angular acceleration data collected by a motion sensor in a terminal device;
   determining a movement trajectory of the terminal device according to the angular acceleration data;
   determining an operation instruction corresponding to the movement trajectory of the terminal device according to a preset mapping relationship between the movement trajectory and the operation instruction; and
   sending the operation instruction to control a screen of the display terminal to switch the display content,
   wherein the method further comprises displaying a prompt message indicating that the terminal device is disabled in response to detecting that the terminal device does not contain a motion sensor.

2. The method according to claim 1, wherein, before the acquiring angular acceleration data collected by a motion sensor in a terminal device, the method further comprises:
   determining a screen orientation of the terminal device according to acceleration data collected by the motion sensor; and
   performing the step of acquiring angular acceleration data collected by a motion sensor in a terminal device when the screen orientation of the terminal device is a target direction.

3. The method according to claim 2, wherein determining a movement trajectory of the terminal device according to the angular acceleration data comprises:
   determining whether the terminal device rotates according to the angular acceleration data; and
   determining the movement trajectory of the terminal device according to the screen orientation and the angular acceleration data, in response to the rotation of the terminal device.

4. The method according to claim 3, determining the movement trajectory of the terminal device according to the screen orientation and the angular acceleration data, in response to the rotation of the terminal device comprises:
   mapping an angular acceleration of each coordinate axis of a coordinate system where the terminal device is located in the angular acceleration data to the earth coordinate system, according to the screen orientation;
   if an absolute value of the angular acceleration of the Z coordinate axis of the earth coordinate system is greater than an absolute value of the angular acceleration of the X coordinate axis of the earth coordinate system, determining the movement trajectory of the terminal device as a first movement trajectory when the angular acceleration of the Z coordinate axis of the earth coordinate system is greater than 0;
   determining the movement trajectory of the terminal device as a second movement trajectory when the angular acceleration of the Z coordinate axis of the earth coordinate system is less than 0; and
   determining the movement trajectory of the terminal device as a third movement trajectory, if the absolute value of the angular acceleration of the X coordinate axis of the earth coordinate system is greater than or equal to the absolute value of the angular acceleration of the Z coordinate axis of the earth coordinate system.

5. The method according to claim 4, wherein sending the operation instruction to control a screen of the display terminal to switch the display content comprises:
   sending an operation instruction of displaying a previous page corresponding to the first movement trajectory, to control the screen of the display terminal to display a content of the previous page; or,
   sending an operation instruction of displaying a next page corresponding to the second movement trajectory, to control the screen of the display terminal to display a content of the next page; or,
   sending an operation instruction of displaying current details corresponding to the third movement trajectory, to control the screen of the display terminal to display details of current contents.

6. The method according to claim 3, wherein, after determining whether the terminal device rotates according to the angular acceleration data, the method further comprises:
   in response to the rotation of the terminal device, stopping sending the operation instruction within a preset time period; repeating the step of acquiring angular acceleration data collected by a motion sensor in a terminal device after the preset time period elapses.

7. The method according to claim 6, wherein a range of the preset time period is 0.5s~2s.

8. The method according to claim 3, wherein, after determining whether the terminal device rotates according to the angular acceleration data, the method further comprises:
   returning to the step of acquiring angular acceleration data collected by a motion sensor in a terminal device in response to determining that the terminal device does not rotate.

9. The method according to claim 3, wherein determining whether the terminal device rotates according to the angular acceleration data comprises:
   determining that the terminal device does not rotate if the angular acceleration of each coordinate axis of the coordinate system where the terminal device is located is less than a preset threshold; and
   otherwise, determining that the terminal device rotates.

10. The method according to claim 2, wherein, after determining a screen orientation of the terminal device according to acceleration data collected by the motion sensor, the method further comprises:
    not performing the step of sending the operation instruction to control a screen of the display terminal to switch the display content, when the screen orientation of the terminal device is not the target direction.

11. The method according to claim 1, wherein the method is performed by at least one hardware processor through execution of program code stored on a non-transitory computer-readable storage medium.

12. A method for controlling a screen display content of a display terminal, the method comprising:
    receiving a control message sent by a server, wherein the control message is sent after the server receives an operation instruction sent by a terminal device, wherein the operation instruction is determined by the terminal device according to its own movement trajectory and a preset mapping relationship between the movement trajectory and the operation instruction; and
    switching the display content according to the control message,
    wherein the method further comprises displaying a prompt message indicating that the terminal device is disabled in response to detecting that the terminal device does not contain a motion sensor.

13. An apparatus for controlling a screen display content of a display terminal, the apparatus comprising:
    at least one hardware processor;
    non-transitory program instructions stored in memory and executable by the at least one hardware processor that, when executed, direct the at least one hardware processor to:
    acquire angular acceleration data collected by a motion sensor in a terminal device;
    determine a movement trajectory of the terminal device according to the angular acceleration data;
    determine an operation instruction corresponding to the movement trajectory of the terminal device according to a preset mapping relationship between the movement trajectory and the operation instruction; and
    send the operation instruction to control a screen of the display terminal to switch the display content,
    wherein the at least one hardware processor is further directed to: display a prompt message indicating that the terminal device is disabled in response to detecting that the terminal device does not contain motion sensor.

14. The apparatus according to claim 13, wherein the at least one hardware processor is further directed to:
    determine a screen orientation of the terminal device according to acceleration data collected by the motion sensor; and
    acquire angular acceleration data collected by a motion sensor in a terminal device, when the screen orientation of the terminal device is a target direction.

15. The apparatus according to claim 14, wherein the at least one hardware processor is further directed to:
  determine whether the terminal device rotates according to the angular acceleration data; and
  determine the movement trajectory of the terminal device according to the screen orientation and the angular acceleration data, in response to the rotation of the terminal device.

16. The apparatus according to claim 15, wherein the at least one hardware processor is further directed to:
  map an angular acceleration of each coordinate axis of a coordinate system where the terminal device is located in the angular acceleration data to the earth coordinate system, according to the screen orientation;
  if an absolute value of the angular acceleration of the Z coordinate axis of the earth coordinate system is greater than an absolute value of the angular acceleration of the X coordinate axis of the earth coordinate system, determine the movement trajectory of the terminal device as a first movement trajectory when the angular acceleration of the Z coordinate axis of the earth coordinate system is greater than 0;
  determine the movement trajectory of the terminal device as a second movement trajectory when the angular acceleration of the Z coordinate axis of the earth coordinate system is less than 0; and
  determine the movement trajectory of the terminal device as a third movement trajectory, if the absolute value of the angular acceleration of the X coordinate axis of the earth coordinate system is greater than or equal to the absolute value of the angular acceleration of the Z coordinate axis of the earth coordinate system.

17. The apparatus according to claim 16, wherein the at least one hardware processor is further directed to:
  send an operation instruction of displaying a previous page corresponding to the first movement trajectory, to control the screen of the display terminal to display a content of the previous page; or,
  send an operation instruction of displaying a next page corresponding to the second movement trajectory, to control the screen of the display terminal to display a content of the next page; or,
  send an operation instruction of displaying current details corresponding to the third movement trajectory, to control the screen of the display terminal to display details of current contents.

18. The apparatus according to claim 15, wherein the at least one hardware processor is further directed to:
  in response to the rotation of the terminal device, stop sending the operation instruction within a preset time period; and
  repeat the step of acquiring angular acceleration data collected by a motion sensor in a terminal device after the preset time period elapses.

19. The apparatus according to claim 15, wherein the at least one hardware processor is further directed to return to the movement trajectory processor in response to a determination that the terminal device does not rotate.

* * * * *